(12) United States Patent
Gauthy

(10) Patent No.: US 6,586,532 B1
(45) Date of Patent: Jul. 1, 2003

(54) POLYOLEFINS AND METHOD FOR THE PRODUCTION THEREOF

(75) Inventor: Fernand Gauthy, Wemmel (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/926,416

(22) PCT Filed: Apr. 25, 2000

(86) PCT No.: PCT/EP00/03733

§ 371 (c)(1),
(2), (4) Date: Feb. 20, 2002

(87) PCT Pub. No.: WO00/66641

PCT Pub. Date: Nov. 9, 2000

(30) Foreign Application Priority Data

Apr. 29, 1999 (BE) .............................. 9900309

(51) Int. Cl.⁷ .................. C08F 255/02; C08F 267/04; C08J 3/05

(52) U.S. Cl. .................. 525/285; 525/327.8; 525/369; 528/500

(58) Field of Search .............................. 525/285, 327.8, 525/369; 528/500

(56) References Cited

U.S. PATENT DOCUMENTS

| | | | |
|---|---|---|---|
| 4,668,721 A | | 5/1987 | Seltzer et al. |
| 5,002,831 A | * | 3/1991 | Plueddemann .............. 428/447 |
| 5,650,468 A | * | 7/1997 | Vandevijver et al. |
| 5,698,637 A | | 12/1997 | Aaerila |

FOREIGN PATENT DOCUMENTS

| | | |
|---|---|---|
| EP | 0 202 921 | 11/1986 |
| EP | 0 370 736 | 5/1990 |
| EP | 0 659 784 | 6/1995 |
| EP | 0 849 318 | 6/1998 |
| EP | 0 939 089 | 9/1999 |
| WO | 94 15981 | 7/1994 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

Process for producing polyolefins, comprising the following steps:

a) grafting of acid groups onto polyolefins by means of a graftable monomer bearing at least one functional group chosen from a carbonyl and an acid anhydride, optionally in the presence of another graftable monomer bearing a vinyl unsaturated group and, optionally, one or more aromatic rings;

b) purification, consisting in removing at least some of the graftable monomer bearing at least one functional group chosen from a carbonyl and an acid anhydride that has not reacted with the polyolefins;

c) neutralization of the acid groups by at least one neutralizing agent.

Polyolefin obtained.

22 Claims, 3 Drawing Sheets

POLYOLEFINS AND METHOD FOR THE PRODUCTION THEREOF

BACKGROUND OF THE INVENTION

1. Field of the Invention

The present invention relates to a process for producing polyolefins having special rheological and compatibilization properties, as well as to the resulting polyolefins and to their use.

The problems that arise with polymers in general, and polyolefins in particular, relate to their insufficient melt strength when they are being processed by extrusion.

It is well known that the melt strength of polyethylene (PE) and of polypropylene (PP), which is defined by a high elongational viscosity, is insufficient in certain types of processing, such as extrusion foaming, extrusion blow-moulding, thermoforming and blow moulding, particularly 3D blow moulding.

Solutions proposed for solving this problem consist in making the macromolecular structure of the PE or PP branched by creating covalent bonds between the macromolecules. However, in practice, branched resins manufactured by covalent coupling all suffer from a tendency of the branches to degrade due to the effect of shear inherent in the processing. Moreover, significant irreversible covalent branching results in melt fractures, limiting the productivity and/or quality of the finished product.

In order to be able to increase the connection density between macromolecules without being limited by crosslinking, it is possible to provide a substantial part of the branches via reversible ionic bonds. This makes it possible to increase the melt strength while retaining the thermoplastic character

2. Description of the Related Art

The process disclosed in patent EP 0,086,159 proposes the crosslinking of α-olefin polymers and copolymers in order to improve their melt strength characteristics. The grafting of a carboxylic acid in the presence of a radical generator and the subsequent salt formation by metal compounds are envisaged.

BRIEF DESCRIPTION OF THE INVENTION

The objetive of the present invention is to provide a process for the production of polyolefins having improved properties, especially with regard to melt strength.

The present invention consequently relates to a process for producing polyolefins, comprising the following steps:

a) grafting of acid groups onto polyolefins by. means of a graftable monomer bearing at least one functional group chosen from a carbonyl and an acid anhydride, optionally in the presence of another graftable monomer bearing a vinyl unsaturated group and, optionally, one or more aromatic rings;

b) purification, consisting in removing at least some of the grantable monomer bearing at least one functional group chosen from a carbonyl and an acid anhydride that has not reacted with the polyolefins;

c) neutralization of the acid groups by at least one neutralizing agent.

The polymers obtained by the process according to the present invention have improved properties, especially with regard to melt strength, by virtue of the introduction of an additional purification step b). This is because in the case of processes of the prior art, a relatively large proportion of functional graftable monomers remains in the final product, these monomers not having reacted with the polyolefins. The presence of these functional graftable monomers which have not reacted with the polyolefins, that is to say which have not been grafted onto the polyolefins after step a), may be responsible inter alia for insufficient melt strength and for colour problems. The objective of this purification step b) is consequently to remove at least some of the functional graftable monomers that have not reacted with the polyolefins.

Figure 1:
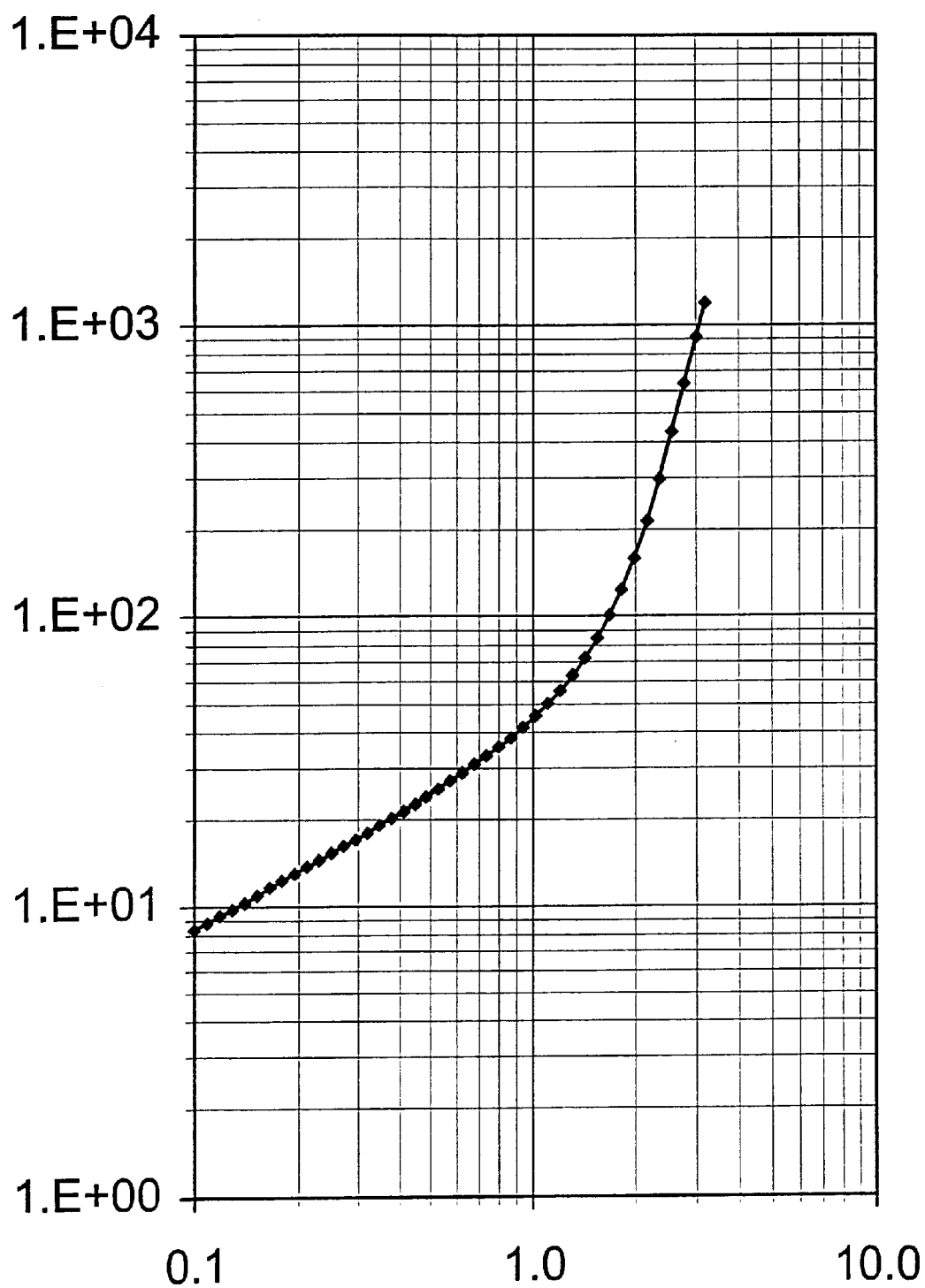
FIG. 1 depicts the variation of elongational melt viscosity with time for the polymer of the example.
Figure 2:
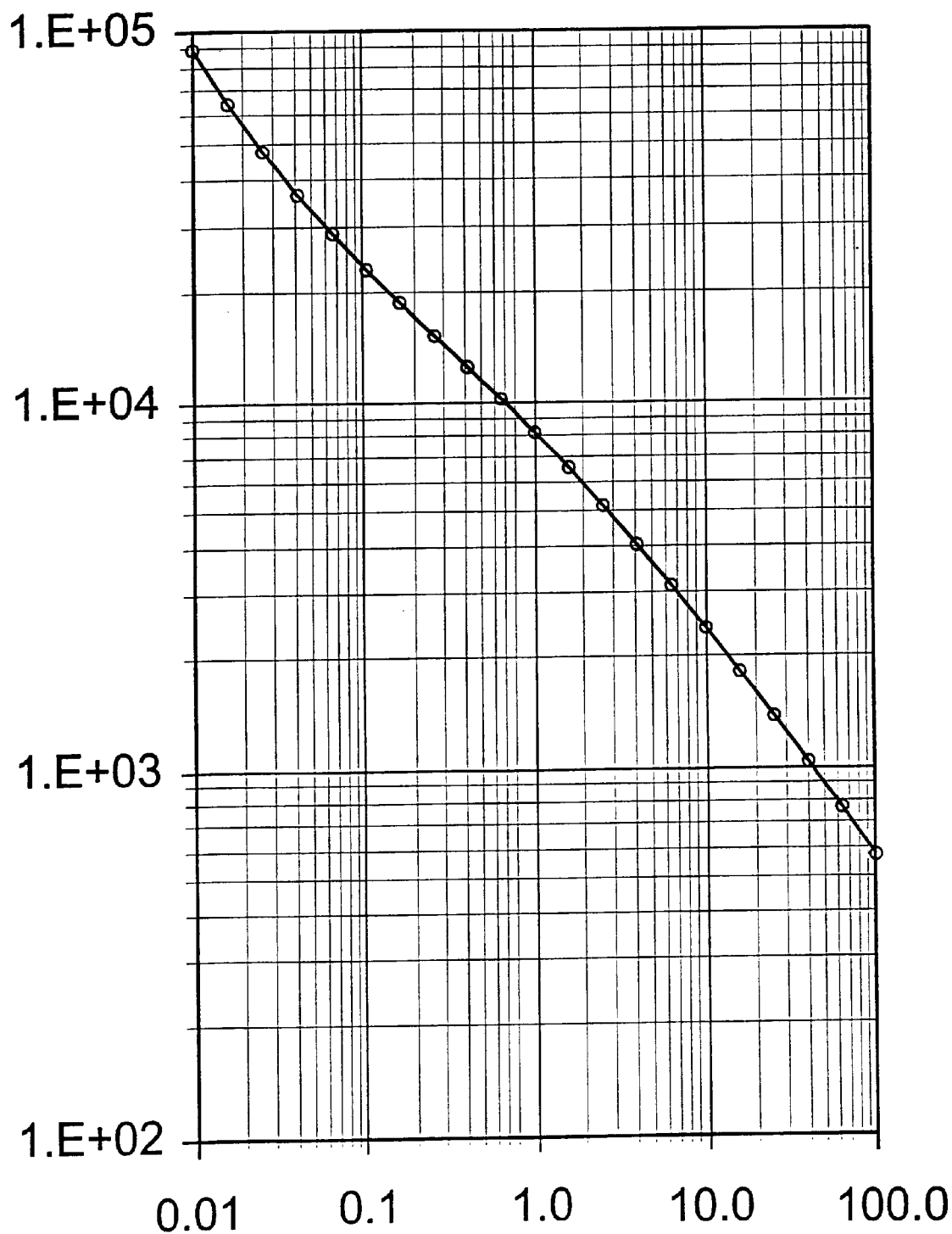
FIG. 2 depicts the variation of the dynamic viscosity as a function of frequency.

The coordinate values in FIGS. 1 and 2 are marked according to the following rule.

The symbol 1.E+01 represents $10^1$=10, 1.E+02 represents $10^2$=100.

One advantageous embodiment of the present invention provides for purification step b) to be carried out by one of the known, standard methods, preferably by removal using acetone, by hot-air stripping, by steam stripping, by stripping with an inert gas or by venting.

The grafting of the acid functional groups onto polyolefins is carried out, for example, by a radical

DETAILED DESCRIPTION OF THE INVENTION

The polyolefins that can be used in the process according to the invention are polymers of linear olefins containing from 2 to 8 carbon atoms, such as ethylene, propylene, 1-butene, 1-pentene, 1-hexene and 1-octene. The linear olefins preferably contain from 2 to 6 carbon atoms, more particularly from 2 to 4 carbon atoms.

The polyolefins may be selected from homopolymers of the aforementioned olefins and from copolymers of these olefins, particularly copolymers of ethylene or propylene with one or more comonomers. Advantageously, the comonomers are chosen from the olefins described above and from diolefins containing from 4 to 18 carbon atoms, such as 4-vinylcyclohexene, dicyclopentadiene, methylene- and ethylidene-norbornene, 1,3-butadiene, isoprene and 1,3-pentadiene.

Preferably, the polyolefins are chosen from propylene polymers and ethylene polymers. Most particularly preferred are the polyolefins chosen from ethylene homopolymer, propylene homopolymer, ethylene copolymers, propylene copolymers, ethylene-propylene copolymers and blends thereof.

The propylene polymers are usually chosen from propylene homopolymers and copolymers whose melt flow index (MFI), measured at 230° C. and under a load of 2.16 kg according to the ASTM D 1238 (1986) standard, is between 0.1 and 2000 dg/min., preferably between 0.1 and 500 dg/min. and particularly preferably between 0.1 and 50 dg/min.

The ethylene polymers are usually chosen from ethylene homopolymers and copolymers having a standard density of between 860 and 996 kg/m$^3$, preferably between 915 and 960 kg/m$^3$ and particularly preferably between 936 and 953 kg/m$^3$, and a melt flow index (measured at 190° C. under a load of 5 kg according to the ISO 1133 (1991) standard) of between 0.01 and 2000 dg/min., preferably between 0.1 and 200 dg/min. and particularly preferably between 1 and 40 dg/min.

The propylene polymers are most particularly preferred.

The graftable monomer bearing at least one functional group chosen from a carbonyl and an acid anhydride may be chosen, for example, from unsaturated monocarboxylic or dicarboxylic acids and derivatives thereof and unsaturated monocarboxylic or dicarboxylic acid anhydrides and derivatives thereof. The graftable monomer preferably contains from 3 to 20 carbon atoms. As typical examples, mention may be made of acrylic acid, methacrylic acid, maleic acid, fumaric acid, itaconic acid, crotonic acid, citraconic acid, maleic anhydride, itaconic anhydride, crotonic anhydride and citraconic anhydride. Maleic anhydride is most particularly preferred.

The amount of graftable monomer bearing at least one functional group chosen from a carbonyl and an acid anhydride, used for the grafting, depends inter alia on the properties that it is intended to obtain in the product, on the amount of radical generator used and therefore on the grafting efficiency and the desired degree of grafting, as well as on the reaction time. In general, the amount of monomer is sufficient to improve the properties of the end product and will generally be between 0.01 and 10% by weight, preferably between 0.1 and 5% by weight, with respect to the polyolefins.

The graftable monomer bearing a vinyl unsaturated group and, optionally, one or more aromatic rings preferably contains from 3 to 20 carbon atoms. As typical examples, mention may be made of 1-dodecene, styrene, vinylpyridine, divinylbenzene, 1,4-hexadiene and mixtures thereof. Styrene is most particularly preferred.

The use of this graftable monomer bearing a vinyl unsaturated group and, optionally, one or more aromatic rings makes it possible, especially in some cases, to increase the degree of grafting of the polyolefins.

If the graftable monomer bearing a vinyl unsaturated group and, optionally, one or more aromatic rings is used, the necessary proportion of this monomer depends on the intended properties and is in general 0.01 to 10% by weight, preferably 0.1 to 5% by weight, with respect to the polyolefins.

One particularly preferred form of the process of the present invention provides for this process to be carried out in the absence of any graftable monomer bearing a vinyl unsaturated group and, optionally, one or more aromatic rings.

The subject of another embodiment of the present invention is therefore a process in which the grafting of acid groups is carried out in the presence of a radical generator.

As radical generators, an organic peroxide, and more particularly an alkyl peroxide, are preferably used. Among these, mention may be made of tert-butylcumyl peroxide, 1,3-di(2-tert-butylper-oxyisopropyl)benzene, 2,5-dimethyl-2,5-di(tert-butyl-peroxy)hexane, di(tert-butyl)peroxide and 2,5-dimethyl2,5-di(tert-butylperoxy)-3-hexane. Particularly preferred is 2,5-dimethyl-2,5-di-tert-butylperoxyhexane (DHBP).

In general, the radical generator is used in the process according to the invention in an amount sufficient to allow the grafting to be carried out. Moreover, it is desirable for the amount not to exceed the minimum amount needed, since any excess radical generator may result in degradation of the polyolefin. The amount is usually at least equal to 0.0005% by weight with respect to the polyolefins and is in particular at least equal to 0.001% by weight, values of at least 0.005% by weight being the most advantageous. In general, the amount does not exceed 3%t by weight, and preferably does not exceed 0.5% by weight, with respect to the polyolefins, values of at most 0.15 being the most recommended.

The step of neutralizing the acid groups is preferably carried out by at least one neutralizing agent which includes a cationic part comprising one or more cations chosen from the group consisting of alkali cations, alkaline-earth cations and transition-metal cations such as, for example, $Zn^{2+}$, $Al^{3+}$ and $Zr^{4+}$. Among alkali cations, $Na^+$ is particularly preferred. Among alkaline-earth cations, $Mg^{2+}$ is particularly preferred.

The neutralizing agent preferably includes an anionic part comprising one or more anions chosen from the group consisting of alcoholates, carboxylates, hydroxides, oxides, alkyls, carbonates and hydrogen-carbonates.

Examples of neutralizing agents are sodium hydroxide, calcium oxide, sodium carbonate, sodium hydrogencarbonate, sodium methoxide, sodium acetate, magnesium ethoxide, zinc acetate, diethylzinc, aluminium butoxide, zirconium butoxide and similar compounds. Sodium hydroxide and zinc acetate are particularly preferred.

The amount of neutralizing agent added depends on the intended use and therefore on the desired properties of the polyolefins. The neutralizing agent is used in an amount of 10% to 300% of the stoichiometric value with respect to the acid groups, preferably in an amount close to stoichiometry. In practice, the amount of neutralizing agent added will be between 0.1 and 1000 meq/kg of polyolefin grafted with acid groups, preferably between 1 and 450 meq/kg of grafted polyolefin, more than preferably between 5 and 300 meq/kg and very particularly preferably between 10 and 100 meq/kg, depending on the degree of grafting of the polyolefin.

The properties of the end product may be further improved by making step c) be followed by a purification step d) consisting in removing the products arising from the reaction of neutralizing the grafted acid functional groups. This purification step may be carried out by any of the known, standard methods, preferably by steam stripping, by hot-air stripping or by venting, preferably by vacuum venting. This purification is often indispensable since it makes it possible to shift the neutralization reaction equilibrium.

In order to carry out the grafting of the acid groups and, optionally, the following steps, all of the devices known for this purpose may be used. Thus, it is possible to work either with external mixers or with internal mixers. Internal mixers are the more appropriate, and among these are BRABENDER® batch mixers, and continuous mixers such as extruders. An extruder in the context of the present invention comprises at least the following parts: a feed zone and thereafter a discharge zone preceded by a compression zone, the latter forcing the melt to pass through the discharge zone.

Reactive extrusion is a known process used for grafting functional groups and consequently, in a preferred embodiment of the process according to the present invention, the grafting step is carried out in an extruder, a technique generally called "reactive extrusion grafting" or "reactive extrusion". Preferably, steps a) and c) of the process are carried out in an extruder.

A particularly preferred extruder for carrying out the process according to the invention is made of a corrosion-resistant alloy. A particularly preferred alloy is an alloy consisting mostly of nickel or cobalt.

Particularly preferably, all the steps are carried out in a continuous process comprising a single step for melting the polyolefins and more than preferably all the steps may be carried out in a single extrusion in an extruder which generally comprises, in addition to the abovementioned zones, optionally, one or more staged feed devices for the separate introduction of the polyolefin or polyolefins, of the graftable monomers bearing at least one functional group chosen from a carbonyl and an acid anhydride, of the radical generator and/or of the stabilizer, one or more screw segments allowing propagation of the material to be extruded, one or more heating zones allowing the constituents to be melted and, where appropriate, one or more venting zones for the purification step or steps. These venting zones must be isolated from the reactant injection zones by a plug of molten material, generally achieved via pairs of screw segments skewed with respect to the direction of flow. The discharge zone may furthermore be followed by a granulator or by a device giving the extrudate a profiled shape, such as a film, a pipe, a sheet, etc. or with a device giving the extrudate a foamed profiled shape by the addition of a blowing agent.

The blowing agent used for the purposes of the present invention is chosen from the blowing agents normally used for generating cells in plastics, such as those described in the work entitled "Encyclopedia of Polymer Science and Engineering, 2nd edition, Vol. 2, 1985, pp. 434–446. The blowing agent may be a blowing agent of the chemical type or of the physical type. Preferably, the blowing agent is of the physical type such as, for example, an alkane (butane, propane, isobutane or pentane), a hydrofluorocarbon, carbon dioxide or mixtures thereof.

In practice, a particularly preferred process according to the present invention may comprise the following steps:
i) introduction and melting of the polyolefin(s);
ii) introduction of the graftable monomers bearing at least one functional group chosen from a carbonyl and an acid anhydride, of the radical generator and, optionally, of the graftable monomer bearing a vinyl unsaturated group and, optionally, one or more aromatic rings;
iii) grafting of the graftable monomers bearing at least one functional group chosen from a carbonyl and an acid anhydride;
iv) removal of the excess graftable monomers bearing at least one functional group chosen from a carbonyl and an acid anhydride that have not reacted;
v) optional introduction of a stabilizer;
vi) introduction of the neutralizing agent;
vii) removal of the anion coming from the neutralizing agent; and
viii) granulation or extrusion of a profiled, optionally foamed, shape.

The temperature of the process is greater than the melting point and less than the decomposition temperature of the polyolefin and of the grafted polyolefin, if necessary, where possible, at an optimum temperature for the radical generator. The temperature therefore depends on the nature of the constituents of the reaction mixture and will in general be at least 100° C., usually at least 130° C. and in particular at least 140° C. Generally, the process is carried out at a temperature not exceeding 400° C., usually not exceeding 300° C. and more particularly not exceeding 250° C.

The time needed to carry out the various steps of the process according to the present invention, in this case the grafting and/or prior purification, the neutralization and/or the final purification, depends on the amounts of reactants used, on the temperature, on the nature of the reactants employed and on the type of reactor used (for example on the type of extruder). In general, it is from 1 second to 1 hour, preferably from 5 seconds to 30 minutes and more particularly from 10 seconds to 10 minutes.

During the process, it is possible to incorporate at any time one or more standard additives for polyolefins, such as, for example, stabilizers, antioxidants, antistatic agents, organic dyes or mineral colorants, and fillers, etc., as long as they do not interfere with the grafting of the acid groups.

In a preferred form of the process according to the invention, at least one stabilizer is added during the process.

Preferably, the stabilizer used in the process of the present invention is chosen from the compounds comprising a sterically hindered phenol group, from phosphorus compounds and from mixtures thereof. These are, for example, substances such as 1,3,5-trimethyl-2,4,6-tris(3,5-tert-butyl-4-hydroxybenzyl)benzene, pentaerythrityl tetrakis(3,5-di-tert-butyl-4-hydroxyphenylpropionate), tris(2,4-di-tert-butylphenyl)phosphite or a mixture of pentaerythrityl tetrakis(3,5-di-tert-butyl-4-hydroxyphenylpropionate) and tris-(2,4-di-tert-butylphenyl)phosphite, preferably in equal amounts. The preferred stabilizer is 1,3,5-trimethyl-2,4,6-tris(3,5-tert-butyl-4-hydroxybenzyl)benzene.

The invention also relates to the polyolefins resulting from the process according to the invention.

The invention furthermore relates to polyolefins containing partially neutralized acid groups, having a melt flow index of 0.001 to 1000 dg/min. and an improved melt strength characterized by an exponential increase in the elongational viscosity and by an increase in the dynamic viscosity at low shear frequencies.

The polyolefins are those defined above.

The melt flow index of the polyolefins containing partially neutralized acid groups is usually from 0.001 to 1000 dg/min., preferably between 0.01 and 100 dg/min. and particularly preferably between 0.1 and 50 dg/min., the melt flow index being measured, in the case of propylene polymers, at 230° C. under a weight of 2.16 kg according to the ASTM D 1238 (1986) standard ard, in the case of ethylene polymers, 190° C. under a weight of 5 kg according to the ISO 1133 (1991) standard.

Preferably, the polyolefins according to the invention are characterized by ionic aggregates having a shape similar to that of a bunch of grapes, the size of the "bunch" being between 10 and 500 nm and the size of the "grapes" being less than 50 nm.

The "bunches of grapes" usually have a size of greater than 10 nm and preferably greater than 50 nm.

The "bunches of grapes" usually have a size of less than 500 nm, preferably less than 200 nm.

The "grapes" constituting the "bunch" usually have a size of less than 50 nm, preferably less than 25 nm and particularly preferably less than 10 nm.

One useful application of the polyolefins is in the production of foams, especially high-density polyethylene foams and polypropylene foams manufactured by extrusion foaming. In particular, a useful application of the polyolefins is in the production of objects shaped by extrusion foaming, thermoforming or blow moulding, particularly by 3D blow moulding. another field of application is in improving the adhesion in compatibilization, multilayer and sealing applications.

The invention also relates to the extrusion foaming process in which the extrusion foaming is carried out consecutively to the polyolefin production process.

The term "consecutively" should be understood to mean that there is only a single melting of the polyolefins for the polyolefin production process and the extrusion foaming process.

The following example serves to illustrate the present invention without in any way limiting its scope.

EXAMPLE

The resin used is an ethylene-propylene random copolymer sold under the trademark ELTEX® P KS 001 PF and is characterized by:

- an MFI (melt flow index measured according to the ASTM D 1238 (1986) standard at 230° C. under a load of 2.16 kg) of 4.5 dg/min.;
- a melting point of 134° C. (measured using the technique of DSC (Differential Scanning Calorimetry) according to the ISO FDIS 11357–3 (1999) standard, at the second pass and with a scan rate of 10 K/min.); and
- a total C2 content (measured by infrared spectrometry) of 4.6%.

The resin is fed into the extruder at a rate of 5 kg/h.

The extruder is a CLEXTRAL BC21 corotating twin-screw extruder. The diameter of the screws is 25 mm and their length is 1200 mm. The speed of rotation of the screws is 300 rpm (rotations per minute). The barrel consists of 12 barrel segments (zones) each having a separate temperature control.

The 12 zones are respectively:

1. feed zone, the resin being fed via a hopper at a rate of 5 kg/h and the temperature of the zone being 80° C.;
2. premelting compression zone (temperature: 180° C.);
3. mixing zone for the melting (temperature: 200° C.);
4. injection zone for injecting the acetone solution of maleic anhydride and of the peroxide (temperature: 200° C.). The acetone solution of maleic anhydride, with a concentration of 187.5 g/litre, is introduced at a rate of 200 ml/h. The acetone solution of the peroxide DHPP, with a concentration of 30 g/litre, is introduced at a rate of 100 ml/h. This zone is relatively sealed off upstream by a counterflight segment and downstream by a grooved counterflight segment. These counterflights reduce the rate of advance of the melt and create a dynamic plug;
5. venting zone for venting the unconverted reactants in zone 4 and the acetone (temperature: 240° C.);
6. injection zone for injecting the acetone solution of the 1,3,5-trimethyl-2,4,6-tris(3,5-tert-butyl-4-hydroxybenzyl)benzene stabilizer having a concentration of 75 g/litre. The solution is introduced at a rate of 200 ml/h. The temperature of the zone is 240° C.;
7. additional venting zone for venting the unconverted reactants in zone 4 and acetone (temperature: 240° C.);
8. injection zone for injecting zinc acetate in aqueous solution with a concentration of 220 g of zinc acetate per litre of aqueous solution. The rate of introduction is 200 ml/h and the temperature of the zone is 180° C.;
9. venting zone for removing water and acetic acid (temperature: 240° C.);
10. mixing zone (temperature: 240° C.);
11. additional venting zone for removing water and acetic acid (temperature: 240° C.);
12. compression zone for forcing the material through the die (temperature: 200° C.).

After these 12 barrel zones, a die is used to convert the melt into a rod which is cooled and converted into granules.

The final polymer is characterized by an MFI of 7.4 dg/min. It is also characterized by the techniques of RME, ARES and transmission electron microscopy, as indicated below.

The elongational viscosity of the polymer in question is determined by means of a rheometer sold by Rheometrics under the name RME (Rheometrics elongational rheometer for melts). The specimen (55×9×2 mm) is obtained by extrusion and is subjected to a relaxation procedure before the measurements. The curve plotted in FIG. 1 (RME plot) represents the variation at 190° C. in the elongational melt viscosity (expressed in kpa.s) as a function of time (expressed in s) for a strain rate (expressed in $s^{-1}$) of 1.

The polymer produced in the example exhibits an exponential increase in the elongational viscosity as a function of time, characteristic of structural hardening under stress (melt strength).

The dynamic viscosity is determined by means of a fixed-strain rheogoniometer sold by Rheometrics under the name ARES (Advanced Rheological Expansion System). The measurements are carried out on the specimen which is placed between two parallel plates and subjected to a strain, the specimen, with a diameter of 25 mm and a thickness of 2 mm, being cut from a pressed plaque. The curve plotted in FIG. 2 (ARES plot) shows the variation at 170° C. in the dynamic viscosity expressed in Pa.s as a function of the frequency expressed in rad/s.

The polymer produced in the example is characterized by an increase in the dynamic viscosity at low frequencies.

Transmission electron microscopy is carried out by means of a ZEISS EM 910 microscope. The examination was performed on ultramicrotomed sections approximately 90 nm in thickness.

Figure 3:
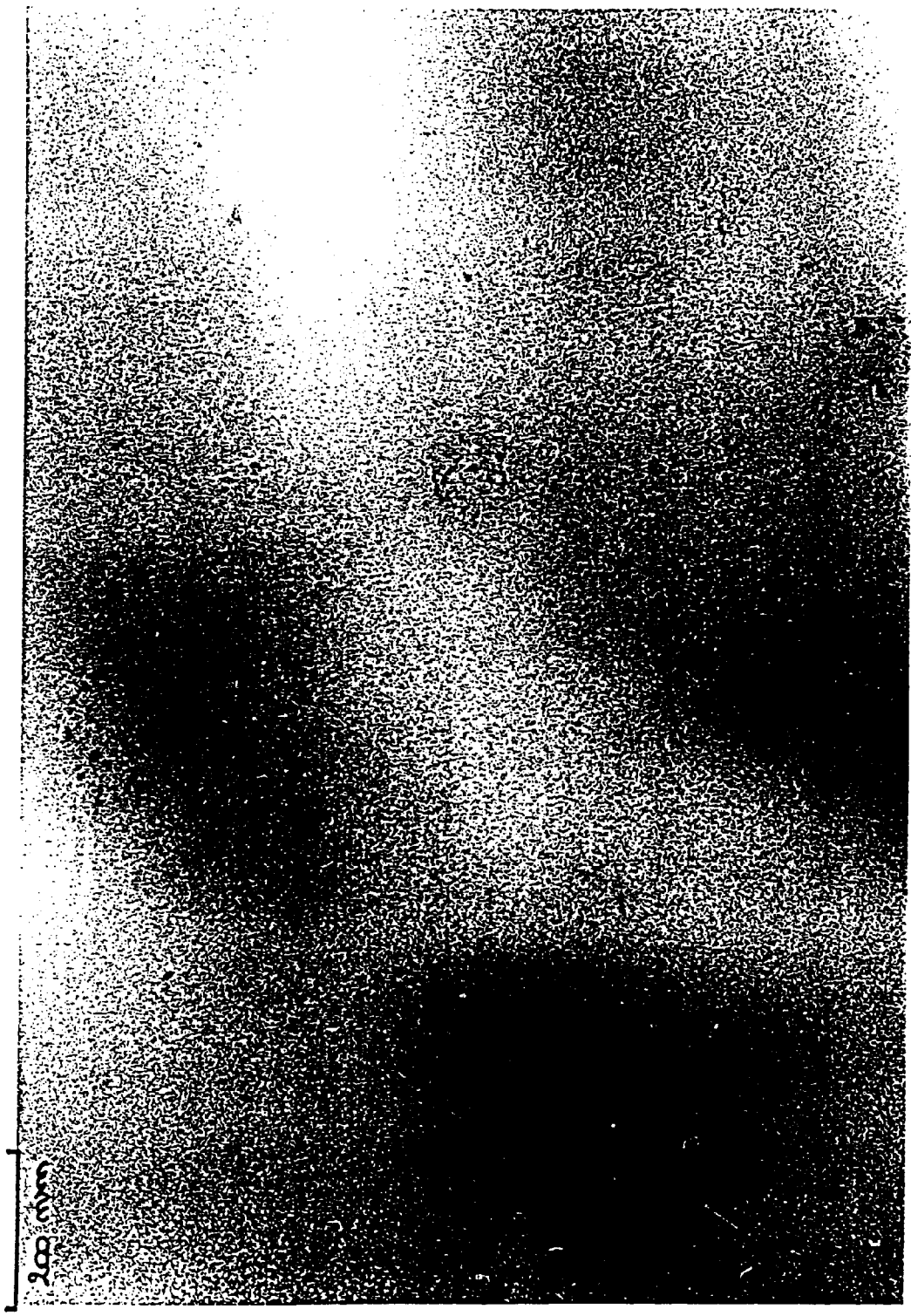
FIG. 3 is a transmission electron microscope photograph.

FIG. 3 shows the photograph obtained by transmission electron microscopy. Ionic aggregates having a shape similar to that of a bunch of grapes may be seen in this figure, the size of the "bunch" being of the order of 100 to 200 nm and the size of the "grapes" being of the order of 10 nm.

Analyses carried out by X-ray microanalysis using a LINK eXL II system attached to the ZEISS EM 910 microscope clearly demonstrate the presence of zinc in the ionic aggregates, particularly in the "grapes" making up the "bunch".

What is claimed is:

1. A process for producing a polyolefin, comprising the following steps:
   a) grafting acid groups onto a polyolefin by means of a graftable monomer bearing at least one functional group chosen from the group consisting of a carbonyl and an acid anhydride, optionally in the presence of another graftable monomer bearing a vinyl unsaturated group and, optionally one or more aromatic rings;
   b) purifying the product of step a) by removing at least a portion of the graftable monomer bearing at least one functional group chosen from the group consisting of a carbonyl and an acid anhydride that has not grafted with the polyolefin to produce a purified product;
   c) neutralizing the acid groups of the purified product by reacting with zinc acetate, the grafting step a) and the step c) being carried out in an extruder.

2. The process according to claim 1, wherein purifying is carried out by removal of at least a portion of the graftable monomer with acetone, by hot-air stripping, by steam stripping, by stripping with an inert gas or by venting.

3. The process according to claim 1, wherein the polyolefin is chosen from the group consisting of propylene polymers and ethylene polymers.

4. The process according to claim 1, wherein the graftable monomer bearing at least one functional group is chosen from the group consisting of a carbonyl and an acid anhydride is maleic anhydride.

5. The process according to claim 1, wherein the graftable monomer bearing at least one functional group chosen from the group consisting of a carbonyl and an acid anhydride is added in an amount of from 0.01 to 10% by weight with respect to the polyolefin.

6. The process according to claim 1, wherein the process is carried out in the absence of a graftable monomer bearing a vinyl unsaturated group and, optionally one or more aromatic rings.

7. The process according to claim 1, wherein grafting of the acid group is carried out in the presence of a radical generator.

8. The process according to claim 1, wherein the zinc acetate is added in an amount of from 0.1 to 1000 meq./kg of polyolefin grafted with acid groups.

9. The process according to claim 1, further comprising the step of purifying d), said purifying d) comprising removing a product arising from neutralizing the grafted acid groups, wherein purifying d) follows neutralizing c).

10. The process according to claim 9, wherein purifying d) is carried out by steam stripping, by hot-air stripping or by venting.

11. The process according to claim 1, wherein the extruder is made of a corrosion-resistant alloy.

12. The process according to claim 1, wherein the process is carried out in a continuous process comprising a single step for melting the polyolefin.

13. The process according to claim 1, further comprising adding one or more additives during the process.

14. The process according to claim 1, further comprising adding at least one stabilizer during the process.

15. The process according to claim 14, wherein the stabilizer is a compound comprising a sterically hindered phenol group, a phosphorus compound or a mixture thereof.

16. The process according to claim 15, wherein the stabilizer is a mixture of pentaerythrityl tetrakis(3,5-di-tert-butyl-4-hydroxyphenylpropionate) and tris(2,4-di-tert-butylphenyl)phosphite.

17. The process according to claim 15, wherein the stabilizer is 1,3,5-trimethyl-2,4,6-tris-(3,5-tert-butyl-4-hydroxybenzyl)benzene.

18. A polyolefin produced by the process of claim 1, comprising a plurality of partially neutralized acid groups, said polyolefin having a melt flow index, measured at 230° C. under a load of 2.16 kg for propylene polymers according to ASTM D 1238 Standard and at 190° C. under a load of 5 kg for ethylene polymers according to ISO 1133 Standard, of from 0.001 to 1000 dg/min. and an improved melt strength characterized by an exponential increase in the elongational viscosity as a function of time and by an increase in the dynamic viscosity at low shear frequencies.

19. The polyolefin according to claim 18, comprising ionic aggregates having a shape similar to a bunch of grapes, the size of said bunch being between 10 and 500 nm and the size of a grape being less than 50 nm.

20. A process comprising extrusion foaming, thermoforming or blow molding the polyolefin claimed in claim 18.

21. A process comprising compatibilizing, sealing or adhering wherein the polyolefin claimed in claim 18 is the compatibilizer, sealant or adhesive.

22. An extrusion foaming process comprising extrusion foaming a material, wherein said extrusion foaming process is carried out consecutively to the polyolefin production process claimed in claim 1.

* * * * *